May 16, 1967   R. N. McCAFFREY ETAL   3,320,603
BOMBING RELEASE INDICATOR FOR USE WITH A RANGE RADAR
Filed July 7, 1964
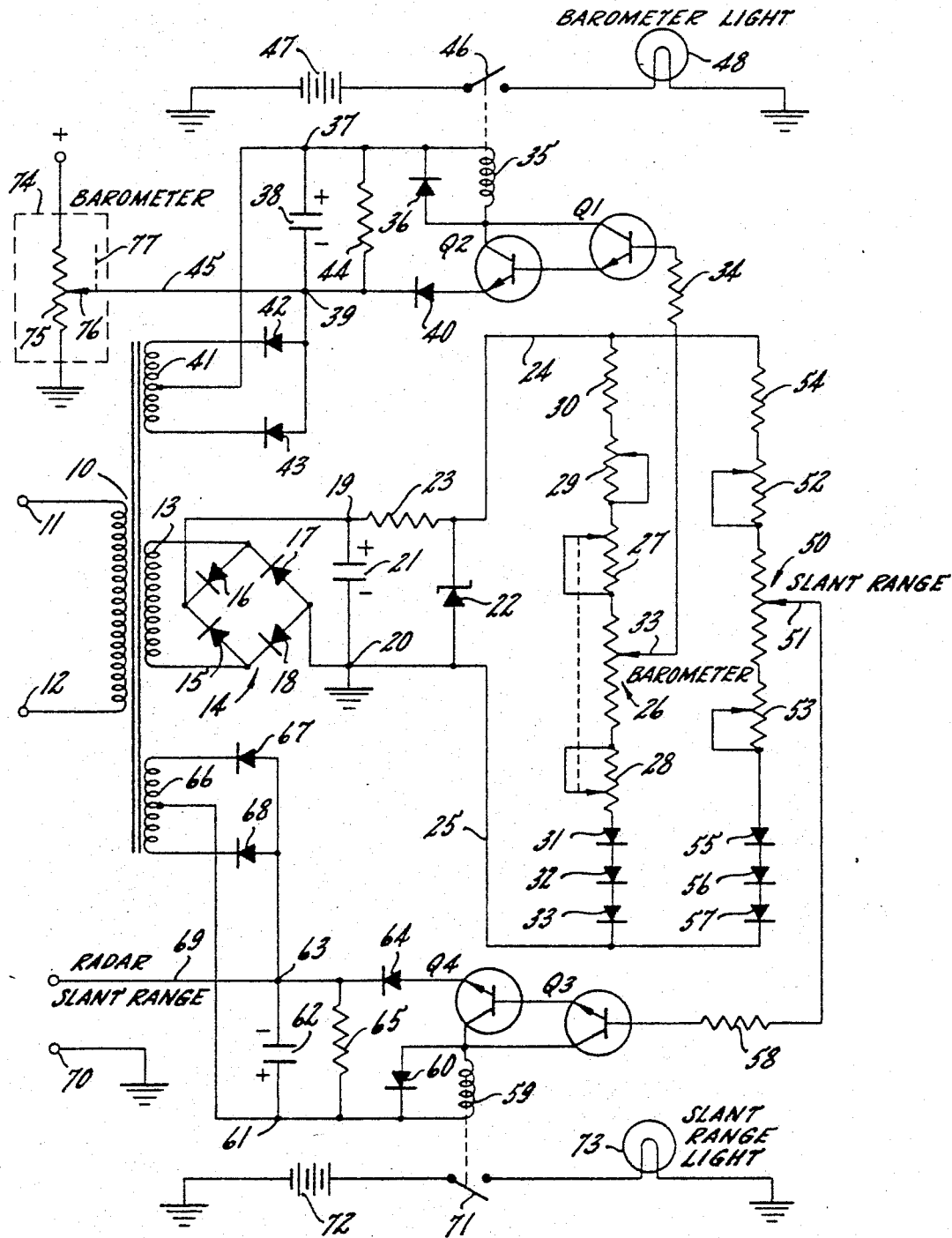
INVENTORS.
ROBERT N. McCAFFREY
RICHARD E. McCORMICK
BY
W. H. Leach
ATT'YS.

United States Patent Office

3,320,603
Patented May 16, 1967

1

3,320,603
BOMBING RELEASE INDICATOR FOR USE WITH
A RANGE RADAR
Robert N. McCaffrey, Indianapolis, and Richard E. McCormick, Beech Grove, Ind., assignors to the United States of America as represented by the Secretary of the Navy
Filed July 7, 1964, Ser. No. 380,961
5 Claims. (Cl. 340—248)

ABSTRACT OF THE DISCLOSURE

A tactical bomb release indicator for fighter aircraft which gives altitude and slant range indications to the pilot and bombadier at coincidence of the respective analog voltages fed thereto from the aircraft altimeter and slant range radar respectively with preset analog voltage of altitude and slant range established for the optimum bombing mission in the terrain of the mission.

---

The invention described herein may be manufactured and used by or for the Government of the United States of America for governmental purposes without the payment of any royalties thereon or therefor.

Background of the invention

This invention relates to fighter aircraft bombing indicator circuits and more particularly to transistor cascaded circuits for comparing preselected analog voltages representative of a predetermined bombing altitude and slant range for fighter aircraft with instrumented analog voltages of actual altitude and slant range to energize indicators upon the substantial equalization of the preselected and instrumented analog voltages.

There are a number of well known fighter aircraft bombing release indicator devices, many of which automatically release bombs or missiles at preset or prearranged altitudes or dive angle positions to effect target destruction. Most of these bombing release indicator devices utilize a network of computers and measuring devices to actuate indicators or warning signals for the pilot or to automatically actuate bomb release mechanisms on the aircraft. As more accurate systems are devised, more weight and space are required in the aircraft for these system until these requirements become burdensome for effective fighter aircraft operation and control. These complicated bombing systems find better use in the bomber type aircraft and become more of a burden to fighter aircraft. There is still a need for simple bomb release indicating systems which allows the pilot to actually send bombs or missiles away in accordance with an indication resulting from instrumentation forming a part of the normal equipment of the fighter aircraft.

Summary of the invention

In this invention signal information is taken from fighter aircraft instrumentation such as analog voltages representative of altitude and radar slant range for the bombing release indicating device. The bombing release indicating device of this invention is simple, light weight, and small in size so that it should not be in any way burdensome to the weight or space requirements of the fighter aircraft. This invention utilizes cascaded transistor cir-

2 cuitry for comparing the actual analog voltages from the aircraft instrumentation representative of the barometric pressure or altitude and the radar slant range with preselected analog pressure or altitude and slant range voltages to produce indications at some predetermined compared relationship. The power for the transistor circuitry may be supplied from the aircraft power supply or from the aircraft radar power supply so that a common reference, such as ground or airframe voltage, will apply to both the aircraft instrumentation and bombing release indicating system of this invention. The preselected analog voltages for barometric pressure and for slant range are provided by ten-turn precision and dial calibrated potentiometers enabling the pilot to preset into the bombing release indicating means of this invention the desired altitude and slant range at which he desires indication for bomb or missile expenditure. Ordinarily, the dial on the barometric pressure potentiometer will be calibrated in altitude while the slant range potentiometer dial will be in slant range. It is therefore a general object of this invention to provide a bombing release indicating means which is simple in its operation, light of weight, and small in size for use in fighter aircraft to aid the pilot of the fighter aircraft in determining a point in space for dispensing bombs or missiles toward a target.

Brief description of the drawing

These and other objects and the attendant advantages, features, and uses will become more apparent to those of ordinary skill in the art as a more detailed description proceeds when considered along with the accompanying drawing in which a circuit schematic figure illustrates a preferred embodiment of the invention.

Description of the preferred embodiment

Referring more particularly to the figure of drawing, there is illustrated a transformer 10 with input terminals 11 and 12 which may be connected to a fighter aircraft alternating current electrical system or the electrical system of the fighter aircraft radar to produce a power supply for the bombing release indicator system of this invention. One secondary 13 of the input transformer 10 is coupled through a rectifier circuit 14 consisting of diodes 15, 16, 17, and 18 arranged in bridge configuration to produce a direct current voltage across the terminals 19 and 20 of a capacitor 21, herein illustrated as producing a positive voltage on terminal 19 and a negative voltage on terminal 20 of the capacitor 21 with terminal 20 being coupled to airframe ground. Parallel to the capacitor 21 is a zener diode 22 to establish an upper voltage limit for the voltage output of the rectifier network 14. The positive lead 19 of the capacitor 21 is coupled through a resistor 23 to a positive conductor 24 while the negative or ground based conductor 25 couples the negative terminal 20 of capacitor 21.

A means for adjusting a preselected analog voltage representative of a predetermined altitude is by means of a ten-turn precision barometric pressure potentiometer 26 having its opposite resistance leads coupled in series through trimmer potentiometers 27 and 28 having their adjutsable taps coupled in a ganged relation to properly calibrate the altitude dial on the potentiometer 26. The resistance element of the trimmer potentiometer 27 is coupled in series through the resistance element of a potentiometer 29 and through a fixed resistor 30 to the positive conductor 24. The potentiometer 29 is used to adjust the current flow through the series including the resistance element of the calibrated barometric pressure potentiometer 26. The trimmer potentiometer 28 has its resistance element coupled in series through three temperature compensating diodes 31, 32, and 33 to the negative or ground conductor 25. By this construction the barometric pressure potentiometer 26 can be calibrated in altitude by the trimmer potentiometers 27 and 28 for precision dial operation to produce an analog voltage on the adjustable tap 33 from the regulated voltage supply across the capacitor 21 and Zener diode 22.

The preselected barometric pressure analog voltage established by the adjustable tap 33 as altitude on the dial is conducted through a current limiting resistor 34 to the base of a transistor Q1 coupled in cascade with a second transistor Q2. The cascaded coupling of transistors Q1 and Q2 provides a transistor combination with the collectors coupled in common and the emitter of transistor Q1 coupled to the base of transistor Q2. The common collector electrode of transistors Q1 and Q2 is coupled through a parallel network of a switch relay coil 35 and a diode 36 to a positive terminal 37 of a capacitor 38, the negative terminal 39 thereof being coupled through a diode 40 to the emitter of transistor Q2. The capacitor 38 has a voltage applied thereacross from a secondary winding 41 in the transformer 10 through diodes 42 and 43 to rectify the current in the secondary 41. This produces a direct current floating voltage across capacitor 38 since the applied voltage is not referenced to any fixed potential. Capacitor 38 has a resistance 44 in shunt thereto. A conductor 45 coupled to the altimeter or barometric pressure instrument of the fighter aircraft is coupled to the negative terminal 39 of the capacitor 38 to establish a voltage for comparison with a voltage on the basic electrode of transistor Q1. The diode 36 is coupled in the parallel network incorporating the switch relay coil 35 with the anode thereof coupled to the common collector electrode of transistors Q1 and Q2 to eliminate or limit voltage spikes produced by collapsing magnetic fields in relay coil 35. The diode 40 has its anode coupled to the emitter of transistor Q2 for the reason as will later become clear in the description of operation of the circuit.

The switch contacts 46 of the switch relay coil 35 are in circuit with a battery 47 and an indicator light 48 to cause the indicator light 48 to glow whenever the normally open switch contacts 46 are caused to close by energization of the switch relay coil 35. While a battery 47 is shown as a voltage supply for the indicator light 48, it is to be understood that it is illustrative only and such voltage source may readily be supplied by a secondary on transformer 10 or by any other source, as desired.

A second ten-turn precision potentiometer 50 to preselect a slant range analog voltage on its adjustable tap 51 has its resistance element coupled in series with trimmer potentiometers 52 and 53 across the regulated voltage supply from the conductors 24 and 25. The trimmer potentiometer 52 is coupled in series with a resistance 54 to the positive conductor 24 while the trimmer potentiometer 53 is coupled in series through temperature compensating diodes 55, 56, and 57 to the negative or ground conductor 25. The trimmer potentiometers 52 and 53 are used to properly calibrate the ten-turn precision potentiometer 50 to produce the properly selected slant range on the slant range dial of this potentiometer.

The preselected slant range analog voltage on the adjustable tap 51 of the slant range potentiometer 50 is applied through a current limiting resistor 58 to the base of a transistor Q3 in cascaded coupling with a transistor Q4, the slant range channel herein being coupled in a similar manner to that in the barometric pressure in altitude channel in that the collectors of transistors Q3 and Q4 are coupled in common through a switch relay coil 59 having a diode 60 in parallel therewith to the positive terminal 61 of a capacitor 62. The negative terminal 63 of capacitor 62 is coupled through a diode 64 to the emitter of transistor Q4 with the emitter being coupled to the anode of this diode 64. Capacitor 62 has a resistor 65 coupled in shunt therewith. The positive terminal 61 of capacitor 62 is coupled to the center tap of a secondary winding 66 of transformer 10 while the opposite leads of winding 66 are coupled through diodes 67 and 68 to the negative terminal 63 of capacitor 62 to produce a direct current floating voltage across capacitor 62 in the same manner that a direct current floating voltage is developed across capacitor 38. An analog voltage representative of the fighter aircraft radar slant range is connected by conductor 69 to the negative terminal 63 to be compared with the preselected analog slant range voltage on the emitter of transistor Q4 and yet maintain a constant direct current supply voltage across the capacitor 62 for collector-emitter supply potential. The ground potential or fixed voltage of the fighter aircraft and its equipment is established at terminal 70 herein indicated as being ground or zero potential.

The switch contacts 71 of the switch relay coil 59 are coupled in circuit with a battery 72 and an indicator light 73 in the same manner as indicator light 48 is coupled in circuit, it being understood that battery 72 is illustrative herein and that this voltage may readily come from a secondary winding on the transformer 10 or from some other source, as desired.

It is to be understood that the analog voltage for the barometric pressure or altitude being applied by way of conductor means 45 and the analog voltage representative of slant range coming from the fighter aircraft radar over conductor 69 are voltages which vary in accordance with the altitude and slant range position of the fighter aircraft. For example, the altimeter or barometric pressure of a barometric instrument, indicated within the dotted lines 74 in the aircraft, may be a precision potentiometer 75 coupled between a positive voltage source and ground with the analog voltage barometric pressure taken from the movable tap 76 of this barometer. The movable tap 76 of the potentiometer 75 may be coupled by any mechanical means 77 to the aneroid diaphragm of the altimeter or barometer 74 such that the voltage output of movable tap 76 will vary directly with altitude or inversely with pressure. For example, at sea level the adjustable tap 76 will be near zero potential and will be moved to higher voltages along the potentiometer 75 as the altitude increases. In like manner the analog voltage of the slant range will decrease as the actual slant range of the aircraft decreases. Accordingly, if an aicraft carrying the bombing release indicator means of this invention descends from a high altitude to a lower altitude, the analog voltage of the barometric pressure or altitude on conductor 45 and the analog voltage of the aircraft slant range on the conductor 69 will decrease in value.

*Operation*

In the operation of this device let it be assumed that the pilot of a fighter aircraft carrying the circuit of this invention is to bomb a ground target from an altitude and at a slant range which he has determined to be the best bombing maneuver for the surrounding terrain. He immediately sets this altitude on the calibrated dial of the barometer adjustment constituting the movable tap 33 of the potentiometer 26 and also by the dial adjustment of the movable tap 51 on the slant range potentiometer 50, these being set, of course, at the altitude and slant range for a prescribed bombing strategy. The voltage picked off by the adjustable tap 33 of the barometer potentiometer will be applied to the base of transistor Q1 while the voltage picked off by the adjustable tap 51 will be applied to the base of transistor Q3. The cascaded transistor groups Q1, Q2 and Q3, Q4 rest in the nonconductive state and will remain so as long as the barometric pressure analog voltage on conductor means 45 and the analog slant range voltage on the conductor 69 remain above the base voltages of transistors Q1 and Q3, respectively. As the fighter aircraft descends, the analog voltages on conductors 45 and 69 will decrease proportionately to the descent of the aircraft until the voltage on the negative terminal 39 of capacitor 38 and the negative terminal 63 of capacitor 62 becomes substantially equal to the base voltages on transistors Q1 and Q3, respectively. It is to be understood that the voltage at terminal 39 will become slightly less than the voltage on the base of transistor Q1 due to the internal electrode resistance of transistors Q1 and Q2, this being probably not more than .7 of a volt. The same is true for the Q3 and Q4. Accordingly, when the analog voltage of the barometric pressure or altitude and the analog voltage of the slant range coming from the aircraft instruments are reduced to, or have become less than, the analog voltages adjusted by the potentiometers 26 and 50, the cascaded transistor groups Q1, Q2 and Q3, Q4 will conduct thereby energizing the indicator light circuits. The diodes 40 and 64 are oriented so that the cascaded transistors are isolated for any reverse currents which could be produced by high voltages on the conductors 45 and 69. If the analog voltages on the conductors 45 and 69 drop far below the preselected values, the cascaded transistor comparator circuits would attempt to conduct heavily, but this is prevented by the current limiting resistors 34 and 58. If any high voltages are produced by collapsing magnetic fields in relay coils 35 and 59, the diodes 36 and 60, respectively, will be operative to clip or limit these voltages.

Fighter aircraft pilots have been prone to disbelieve bomb release instrumentation and often override the bomb release circuitry through fear that the indicator circuitry has gone bad and, consequently, have not arrived at the preselected or precalculated position to effect target destruction. In the present circuitry the dual indicating circuits work together to provide a substantially fail safe system for indicating to the pilot when the bomb or missiles should be disposed of for target destruction. If, for any reason, the radar circuit should fail, the barometric channel would still be operative to give the pilot proper indication for altitude bomb release, and vice versa, for slant range bomb release. Also, it may be assumed that the slant range channel would be more accurate of the two channels but it would increase the probability of hit to co-ordinate the two indicating channels for best results in the bombing operation. This bombing release and indicating system provides a very simple means of controlling the expenditure of bombs or missiles since it is only necessary for the pilot to adjust the barometric altitude and slant range potentiometer controls 26 and 50 for a prescribed bombing mission.

While many modifications and changes may be made in the constructional details and features of this invention without departing from the preferred embodiment as shown and described to meet other specific applications, it is to be understood that we desire to be limited in the spirit of our invention only by the scope of the appended claims.

We claim:
1. A transistor voltage comparing indicator circuit comprising:
   a pair of transistors coupled in cascade having a base electrode, a collector electrode, and an emitter electrode;
   a switch relay coil and a first diode in parallel having one terminal coupled to said collector electrode;
   a capacitor;
   means developing a voltage across said capacitor, one terminal of said capacitor being coupled to the other terminal of said parallel coupled coil and diode and the other terminal of said capacitor being coupled through a second diode to said emitter electrode;
   an analog voltage representative of a changing factor coupled to said emitter electrode through said second diode;
   an adjustable voltage coupled to said base electrode for setting in a desired voltage level to be compared by said changing analog voltage; and
   an indicator in circuit with said switch of said switch relay coil whereby the adjustable voltage can be set at a desired level at which the analog voltage will indicate equality by energizing said indicator.

2. A transistor voltage comparing indicator circuit as set forth in claim 1 wherein
   said first diode is oriented with its anode coupled to said collector electrode and said second diode has its anode coupled to said emitter electrode.

3. A transistor bombing release indicator circuit comprising:
   first and second pairs of transistors, each pair being coupled in cascade providing a composite transistor having a base electrode, a collector electrode, and an emitter electrode;
   first and second networks, each consisting of a switch relay coil and a diode in parallel with the anode of the diode being coupled to one terminal and the cathode coupled to the other terminal thereof, said one terminal of said first network being coupled to said collector electrode of said first composite transistor and said one terminal of said second network being coupled to said collector electrode of said second composite transistor;
   first and second capacitors, the first being coupled across the other terminal of said first network and the emitter electrode of said first composite transistor, and the second capacitor being coupled across the other terminal of said second network and the emitter electrode of said second composite transistor, each coupling to the emitter electrode being through a diode oriented with the anode thereof coupled to the emitter electrode;
   a common source of voltage supplying voltage across said first and second capacitors;
   an analog voltage input representative of barometric pressure coupled to the cathode of said diode in the emitter circuit of said first composite transistor;
   an analog voltage input representative of radar slant range coupled to the cathode of said diode in the emitter circuit of said second composite transistor;
   first and second potentiometers, each coupled across a regulated voltage in common thereto, the movable tap of the first potentiometer being coupled to the base electrode of the first composite transistor and the movable tap of the second potentiometer being coupled to the base electrode of the second composite transistor; and
   first and second indicators coupled respectively in circuit with the switch contacts of each first and second switch relay coil whereby adjustment of said first and second potentiometers for a desired altitude and slant range, respectively, will cause indications when said analog voltages of the barometric pressure and slant range compare equally with the voltages established by said potentiometers to present a preselected altitude and range for bomb release.

4. A transistor bombing release indicator circuit as set forth in claim 3 wherein
   said common source of voltage for said first and second capacitors and said regulated voltage in common to the first and second potentiometers are transformed from a common alternating current voltage source and rectified to produce direct current, the regulated voltage having a Zener diode thereacross to regulate the voltage at the Zener voltage.

5. A transistor bombing release indicator circuit as set forth in claim 4 wherein said coupling of said first and second potentiometers across said regulated voltage includes temperature compensating rectifiers in each potentiometer coupling, said first and second capacitors each has a high impedance in shunt thereto; and said coupling of said movable taps of each potentiometer to the respective base electrodes are each through a current limiting resistor.

References Cited by the Examiner

UNITED STATES PATENTS 3,259,841  7/1966  Proctor et al. _____ 340—248 X
3,277,312  10/1966  Harris _____ 328—146 X NEIL C. READ, *Primary Examiner.*

D. MYER, *Assistant Examiner.*